(12) United States Patent
Chen et al.

(10) Patent No.: US 10,341,409 B2
(45) Date of Patent: Jul. 2, 2019

(54) SOFTWARE VERSION CONTROL WITHOUT AFFECTING A DEPLOYED CONTAINER

(71) Applicant: International Business Machines Corporation, Armonk, NY (US)

(72) Inventors: Xiang Chen, Beijing (CN); Bin Gu, Beijing (CN); Cheng Fang Wang, Beijing (CN); WuMi Zhong, Beijing (CN); Jia Zou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 15/149,210

(22) Filed: May 9, 2016

(65) Prior Publication Data

US 2017/0322934 A1 Nov. 9, 2017

(51) Int. Cl.
G06F 17/30 (2006.01)
H04L 29/08 (2006.01)
G06F 8/71 (2018.01)
G06F 9/455 (2018.01)
G06F 9/50 (2006.01)

(52) U.S. Cl.
CPC ............... H04L 67/02 (2013.01); G06F 8/71 (2013.01); G06F 9/455 (2013.01); G06F 9/50 (2013.01); H04L 67/10 (2013.01)

(58) Field of Classification Search
CPC ....... G06F 17/3023; G06F 9/455; H04L 67/02
USPC ........................................................ 707/638
See application file for complete search history.

(56) References Cited

U.S. PATENT DOCUMENTS

| | | | | |
|---|---|---|---|---|
| 8,666,938 | B1* | 3/2014 | Pancholy | G06F 9/455 |
| | | | | 707/610 |
| 9,116,768 | B1* | 8/2015 | Sawhney | G06F 8/60 |
| 9,588,947 | B1* | 3/2017 | Kraiser | G06F 8/30 |
| 9,928,059 | B1* | 3/2018 | Sartor | G06F 8/71 |

(Continued)

OTHER PUBLICATIONS

Krintz, "The AppScale Cloud Platform—Enabling Portable, Scalable Web Application Deployment", IEEE Computer Society, 5 pages, vol. 17, Issue 2, Mar.-Apr. 2013, <http://ieeexplore.ieee.org/xpl.login.jsp?tp=?tp=&arnumber=6488671&url=http%3A%2F%2Fieeexplore.iee.org%2Fxpls%2Fabs_all.jsp%3Farnumber%eD6488671>.

(Continued)

*Primary Examiner* — Pierre M Vital
*Assistant Examiner* — Nargis Sultana
(74) *Attorney, Agent, or Firm* — Daniel R. Simek

(57) ABSTRACT

A method for executing multiple versions of an application within a computing environment. The method includes a computer processor identifying a request to execute an instance of a first version of an application within a computing environment and determining that an instance of a second version of the application is active within the computing environment. The method further includes accessing a data structure including information associated with the application to obtain a first set of data corresponding to the first version of the application. The method further includes copying one or more executable objects associated with the first version of the application based, at least in part, on the first set of data to the computing environment. The method further includes executing the copied one or more executable objects associated with the first version that comprise the requested instance of the first version of the application within the computing environment.

18 Claims, 7 Drawing Sheets

(56) References Cited

U.S. PATENT DOCUMENTS

| | | | | |
|---|---|---|---|---|
| 2003/0018950 | A1* | 1/2003 | Sparks | G06F 9/44536 717/100 |
| 2005/0044523 | A1* | 2/2005 | Wendt | G06F 8/41 717/100 |
| 2005/0262107 | A1* | 11/2005 | Bergstraesser | G06F 16/289 |
| 2005/0262494 | A1* | 11/2005 | Fung | G06F 8/656 717/170 |
| 2005/0283776 | A1* | 12/2005 | McPherson | G06F 9/445 717/162 |
| 2012/0005663 | A1* | 1/2012 | Burckart | G06F 9/44521 717/166 |
| 2014/0297825 | A1* | 10/2014 | Lang | G06F 21/51 709/223 |
| 2015/0100969 | A1* | 4/2015 | Clark | G06F 9/4806 718/104 |
| 2015/0120893 | A1* | 4/2015 | Sapaliga | G06F 8/60 709/222 |
| 2015/0268881 | A1* | 9/2015 | Nielsen | G06F 11/1438 711/114 |
| 2015/0378690 | A1* | 12/2015 | Low | G06F 8/61 717/110 |
| 2016/0092250 | A1* | 3/2016 | Wagner | G06F 9/45558 718/1 |
| 2016/0179509 | A1* | 6/2016 | Raghavan | G06F 8/71 717/121 |
| 2016/0357541 | A1* | 12/2016 | Offer | G06F 16/11 |
| 2017/0060562 | A1* | 3/2017 | Lopez | G06F 8/60 |
| 2017/0090960 | A1* | 3/2017 | Anderson | G06F 9/45516 |
| 2017/0315795 | A1* | 11/2017 | Keller | G06F 8/63 |

OTHER PUBLICATIONS

Yangui, et al., "PaaS-independent approach to provision appropriate cloud resources for SCA-based applications deployment", 2013 Ninth International Conference on Semantics, Knowledge and Grids, Oct. 3-4, 2013, 9 pages, <http://ieeexplore.ieee.org/xpl/login.jsp?tp=&arnumber=6816579&url=http%3A%2F%2Fieeexplore.ieee.org%2Fxpls%2Fabs_all.jsp%3Farnumber%3D6816579>.

* cited by examiner

SOFTWARE VERSION CONTROL WITHOUT AFFECTING A DEPLOYED CONTAINER

BACKGROUND OF THE INVENTION

The present invention relates generally to the field of software application management, and more particularly to version control and restaging software applications within a networked computing environment.

Within a networked computing environment, such as a cloud computing environment various system resources, hardware and software, may be virtualized and dynamically allocated, utilized, and released. Software applications, herein referred to as apps, can be hosted and executed within a networked computing environment via various technologies, such as virtual machines (VMs) and/or software containers (i.e., containers). While a physical or virtualized system can execute containers, various computing environments utilize containers to compliment VMs. In some implementations, one or more software containers can include multiple apps that execute within a VM thereby reducing the number of VMs deployed. Containers provide additional granularity within a VM, such monitoring and controlling the resources utilized by each group of containerized apps. In other implementations, containerized apps can be executed without inclusion within a VM. Containers share a host operating system, which can reduce software licensing costs. In addition, containers utilize fewer resources than a similar number of VMs so resource costs are reduced or more workloads can be supported with the same resources.

Other benefits of containers are that a container provides the bare essentials required to execute an application so containers are more quickly "spun up" or "spun down," containers encapsulate an application, improving isolation and security, containers are more portable between computing environments, and container virtualization can improve the performance of some applications. For example, the performance of database applications is improved by using block storage, which requires direct access to hardware resources, such as storage devices and networking devices. A container can use the same hardware and host operating system (OS) and bypass a layer of hardware emulation of a hypervisor thereby improving performance of a database application. In addition, the efficiency and portability of containers is useful for agile development and operation (i.e., DevOps) of applications.

SUMMARY

Aspects of the present invention disclose a method, computer program product, and/or system for executing multiple versions of an application within a computing environment. In an embodiment, the method includes one or more computer processors identifying a request to execute an instance of a first version of an application within a computing environment. The method further includes one or more computer processors determining that an instance of a second version of the application is active within the computing environment. The method further includes one or more computer processors accessing a data structure that includes information associated with the application to obtain a first set of data corresponding to the first version of the application. The method further includes one or more computer processors copying one or more executable objects associated with the first version of the application, from a network accessible storage device, based on the first set of data to the computing environment. The method further includes one or more computer processors executing the copied one or more executable objects associated with the first version that comprise the requested instance of the first version of the application within the computing environment.

DETAILED DESCRIPTION

Figure 1:
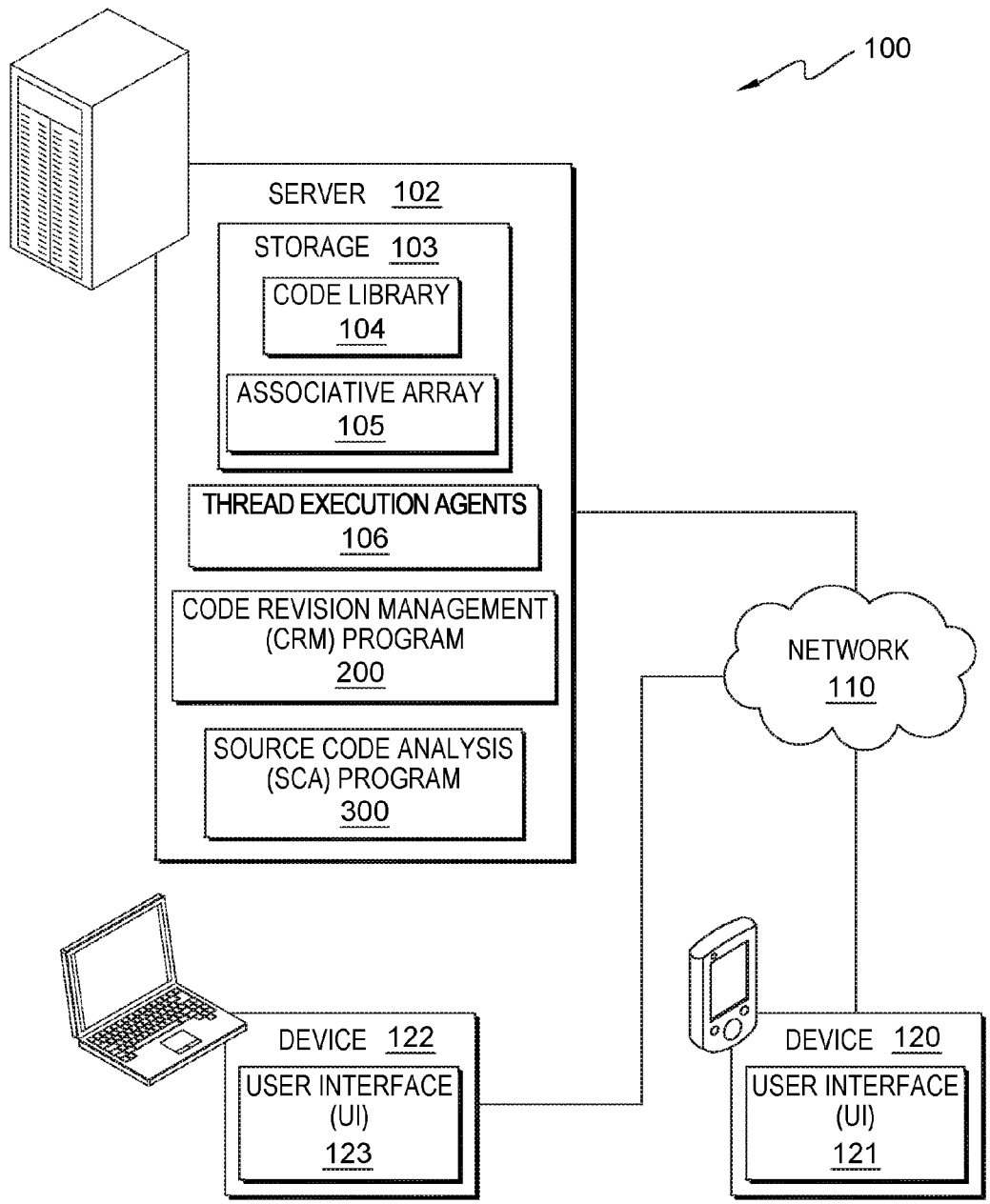
FIG. 1 is a functional block diagram of a portion of a cloud computing environment, in accordance with an embodiment of the present invention.

Embodiments of the present invention recognize that containers for app(s) provide various benefits within a networked computing environment, such as a cloud computing environment. While containers provide advantages over VMs for the development of apps, each revision of an app dictates a restaging of the app that includes rebuilding the container and identifying related artifacts and environment variables utilized by another version of the app. Unless an owner/developer of an app incurs additional cost and possible performance degradation by utilizing persistent storage (e.g., hard disk drives), artifacts and environment variables stored in simple local memory (e.g., random-access memory) may be lost when a container is shut down and restaged. Embodiments of the present invention also recognize that if multiple instances of an app are executing within containers to support a volume of workload, then each group of users (e.g., the users assigned to instances of the app in a container) utilizing the app are affected by the container restaging in response to each deployment of a new version of the app. A deployment of a new version of an app can affected all active containers that include the app or the deployment of the new version of the app may affect selected containers.

Embodiments of the present invention provide an additional virtualization layer (e.g., interface) between a container, that includes an app and the source code/runtime of the app. Embodiments of the present invention utilize this additional virtualization layer to link an app to the source code/runtime of the app and enable multiple versions of the app to deploy within and execute within one container as opposed to creating and staging a container for each version of the app. In addition, embodiments of the present invention can leave a container framework unaltered, and thereby use the same thread execution agent, independent of the version of the app that is requested, to execute the app. Embodiments of the present invention also dynamically link a thread execution agent to the code of an app, such that during restaging of one instance of the app all unchanged code is not rebuilt and a new instance of the app includes only the changes associated with a version change without replacing the thread execution agent. In addition, some embodiments of the present invention can utilize an autoscaling method to replace inactive instances of one version of an app with another version of the app.

Embodiments of the present invention utilize various data structures, such as associative arrays, a matrix, etc., as a method of providing virtual pointers that link versions of an app (e.g., source code, compiled code), thread execution agents, buildpacks, and libraries to version control information and/or a revision identifier (RID) included in a request to execute an app. In various embodiments of the present invention, version control information, version information, revision information, and/or RID may be used interchangeably. An RID and/or RID data may be a value, a text string, a statement, or other identification. One example of an RID may be a string, such as "Version 2.025.a." In another example, the revision identifier may obfuscate version information by utilizing a unique identifier "RID=T897-VTZE." Some embodiments of the present invention utilize various aspects of representational state transfer services (RESTful services) utilized within the architecture of the Internet (e.g., World Wide Web) to identify RID data within a request to execute the app. In one example, one or more RESTful services is utilized analyze an HTTP request by a web browser or web-user interface to identify if a request includes and RID and a value and/or information corresponding to the identified RID. In another example, another program within a cloud computing environment initiates a request that includes a RID to execute an app associated with the RID. Embodiments of the present invention are not limited to utilizing RESTful web services to identify a RID in a request to execute an app and/or enable embodiments of the present invention.

Some embodiments of the present invention utilize a unique identifier, such as universally unique identifier (UUID) to identify one or more elements associated with a RID, such as a RID data, one or more portions and/or modules of source code associated with a RID data, one or more binary objects (e.g., compiled code) and/or libraries associated with a RID data, a container, a buildpack, a thread execution agent associated with a RID data, etc. In an example, one or more associative arrays may be linked via a UUID, such as one associative array that includes classloader information and class-loader cache for an app, and another associative array associated with source code, compiled code, Diff files between RIDs, etc.

Further embodiments of the present invention may scan a library of apps to determine whether various versions/revisions of an app exist but do not currently utilize RID control for executing the various revisions of the app. The further embodiments of the present invention can obtain UUIDs, update and/or create an associative array to support the app, utilize various aspects of the present invention, and interface with an owner/developer of the app to provide multi-version (e.g, RID) support for subsequent request to execute the app.

Implementation of embodiments of the invention may take a variety of forms, and exemplary implementation details are discussed subsequently with reference to the Figures.

The present invention will now be described in detail with reference to the Figures. FIG. 1 is a functional block diagram illustrating a portion of a cloud computing environment, generally designated environment 100, in accordance with one embodiment of the present invention, such as cloud computing node 10 (discussed in further detail with respect to FIG. 6). An embodiment of environment 100 includes: server 102, device 120, and device 122 all interconnected over network 110. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Server 102, device 120, and device 122 may be laptop computers, tablet computers, netbook computers, personal computers (PC), desktop computers, personal digital assistants (PDA), smart phones, wearable devices (e.g., digital eyeglasses, smart glasses, a smart watch), or any programmable computer systems known in the art. In certain embodiments, server 102, device 120, and device 122 represent computer systems utilizing clustered computers and components (e.g., database server computers, application server computers, etc.) that act as a single pool of seamless resources when accessed through network 110, as is common in data centers and with cloud-computing applications. In general, server 102, device 120, and device 122 are representative of any programmable electronic device or combination of programmable electronic devices capable of executing machine-readable program instructions and communicating with users of server 102, device 120, and device 122, via network 110. Server 102, device 120, and device 122 may include components, as depicted and described in further detail with respect to FIG. 5, in accordance with embodiments of the present invention.

Server 102 includes: storage 103, thread execution agents 106, code revision management (CRM) program 200, and source code analysis (SCA) program 300. Server 102 also includes various programs and databases, such as a website interface, one or more web daemons, an integrated development environment (IDE), a network communication program, etc. (not shown) within storage 103.

In one embodiment, storage 103 includes code library 104 and associative array 105. Storage 103 may also include: buildpack information for an app, and caching the program loaders of a container that includes the app so that the program loaders may be created once for a RID of the app and the program loader reused for subsequent requests to execute the RID of the app included in a program loader cache (e.g., class-loader cache set). In some embodiments, a program loader is included in and/or based on a function, script, method, a component of a programming language/environment, etc. In other embodiments, a program loader is an object that loads various classes associated with an app. In an example, a class-loader may be based on a primordial class-loader of a run-time system that is customized to override and/or direct various methods and stages of the loading and execution of an app. In various embodiments, storage 103 also includes functions, scripts, routines, and/or programs that generate a program loader in response to a determination by one or more aspects of the present invention that a program loader is not available for a requested version of an application.

Code library 104 includes: source code, binary objects, object code, compiled executable codes, etc. associated with one or more apps (e.g., web apps). In some embodiments, code library 104 includes a plurality of source code files and/or modules that may be compiled into an executable form or an object file. In one example, each version (e.g., revision) of an app can correspond to a single source code file. In another example, two or more code modules associated with a RID or a unique identifier corresponding the RID, are identified within associative array 105. In some embodiments, if a compiled version of the app corresponding to a requested version of the app is not identified within code library 104, then the two or more code modules corresponding to a RID are compiled (discussed in further detail with respect to CRM program 200). In various embodiments, code library 104 may be included in one or more storage devices accessible via network 110, such as within cloud computing environment 50. In an example, a developer of an app stores source code within an IDE (not shown) on device 120 and "pushes" compiled code and other binary objects of the app to an instance of code library 104 on server 102.

Associative array 105 is a data structure, such a hash table, matrix, MAP structure, database, etc. In one embodiment, unique instances of associative array 105 may be created for each app utilizing multi-version support (e.g., RIDs). Associative array 105 may include a plurality of elements, such as but not limited to information, values, software functions/daemons, directory structures that indicate locations (e.g., a directory location) of elements of an app, such as source code, compiled code, and libraries. In another embodiment, associative array 105 may include information for a plurality of apps of a developer that utilize RIDs. Associative array 105 may also include information associated with an app used by various embodiments of the present invention, such as RID data, one or more unique identifiers (e.g., UUIDs), source code file/module identifiers, compiled code identifiers, binary object identifiers, library identifiers, program loader (e.g., class-loader) identifiers, thread execution agent identifiers, etc.

Associative array 105 may also include information associated with an app, such as one or more buildpacks associated with the app. In some embodiments, another instance of associate array 105 may be associated with caching information associated with the thread execution agents and program loaders of an app. In other embodiments, two or more instances of associative array 105 are linked. In an example, information associated with an app includes three instances of associative array 105, where a first instance of associative array 105 includes a UUID assigned to each version of the app. The UUIDs of the first instance of associative array 105 link each version of the app to a second and a third instance of associative array 105. In this example, the second instance of associative array 105 includes information that identifies the source code (e.g., file, modules, etc.) of each version of the app. The third instance of associative array includes information associated with one or more executable objects, such as compiled code that are utilized to stage a version of the app to a container and then execute the version of the app within the container.

Thread execution agents (TEAs) 106 are machines and/or agents of server 102 (e.g., a cloud computing node) that can execute one or multiple apps. In some computing systems/architectures/OSs, a TEA is identified as a droplet execution agent (DEA). TEAs are responsible for a lifecycle of an app: building, staging, starting, and stopping apps as instructed. In one embodiment, one or more TEAs of TEAs 106 track the instances of apps executing on or monitored by server 102. One or more TEAs of TEAs 106 periodically broadcasts messages about the state of each instance of an executing/deployed app. For example, a TEA can report the current quantify of memory that is free on the TEA. In another embodiment a TEA utilizes a buildpack to create app object, such as a container or a droplet within a container that is subsequently executed by a TEA. A buildpack the required runtime or framework for the app. In addition, a buildpack identifies one or more dependencies of the app based on user-provided artifacts.

CRM program 200 is a program that identifies revision control information within a request to execute an app and enables two or more versions (e.g., multi-version support) of the same app to execute within a software container as opposed to a computing environment that utilizes virtualization (e.g., a cloud computing system) to generate a container for each version (e.g., revision) of an app. In some embodiments, CRM program 200 is a service that an owner and/or developer of an app subscribes to enable multi-version support for the app. CRM program 200 may be implemented via one of the functions of abstraction layer 80 of cloud computing environment 50 (described in further detail with respect to FIG. 7). Alternatively, CRM program 200 may be implemented via one of the virtualized aspects of abstraction layer 70 of cloud computing environment 50 (described in further detail with respect to FIG. 7). In other embodiments, CRM program 200 is implemented within a computing environment owned by a business or an organization that develops and/or hosts an app to enable various versions of the app to execute concurrently within the same container.

In one embodiment, CRM program 200 compiles code of an app in response to CRM program 200 not identifying information in associative array 105 that indicates that compiled code for a RID is available. In various embodiments, CRM program 200 executes concurrently with SCA program 300. In other embodiments, CRM program 200 activates SCA program 300 in response to determining that one or more conditions occur with respect to executing an app that utilizes RID (e.g., multi-version support), such as obtaining a UUID for a newly compiled version of code for the app.

Source code analysis (SCA) program 300 is a program that obtains one or more unique identifiers that are associated with one or more elements included in various associative arrays related to an app. In one embodiment, SCA program 300 initiates based on input of a developer of an app and/or an IDE utilized to created and/or modify (e.g., revise) the app, such a receiving a new version of source code of the app. In another embodiment, SCA program 300 is utilized to analyze (e.g., scan) a library of apps to identify apps that are not included in an associative array that supports multi-version control of an app by utilizing RID data or a unique identifier (e.g., a UUID) corresponding to a RID of the app. In some embodiments, SCA program 300 executes concurrently with CRM program 200. In other embodiments, SCA program 300 is activated by one or more aspects of CRM program 200. In various embodiments, SCA program 300 may be implemented via one of the functions of abstraction layer 80 of cloud computing environment 50 (described in further detail with respect to FIG. 7) and provided as another service to an owner/developer of apps.

In one embodiment, device 120 and device 122 communicate through network 110 to server 102. In another embodiment, network 110 may also connect server 102 to one or more nodes of cloud computing environment 50 (discussed in further detail with respect to FIG. 6) that include one or more services, such a monitoring software agreements (discussed in further detail with respect to FIG. 7). In an example, network 110 may include a networking agent/daemon that routes network traffic associated with apps licensed to utilize one or more embodiments of the present invention to server 102. Alternatively, network 110 may route network traffic associated with apps not licensed to utilize embodiments of the present invention to another node within cloud computing environment 50

Network 110 can be, for example, a local area network (LAN), a telecommunications network, a wireless local area network (WLAN), such as an intranet, a wide area network (WAN), such as the Internet, or any combination of the previous and can include wired, wireless, or fiber optic connections. In general, network 110 can be any combination of connections and protocols that will support communications between server 102, device 120, and device 122, in accordance with embodiments of the present invention. In various embodiments, network 110 operates locally via wired, wireless, or optical connections and can be any combination of connections and protocols (e.g., personal area network (PAN), near field communication (NFC), laser, infrared, ultrasonic, etc.). In some embodiments, an instance of network 110 is a virtual LAN (VLAN) that connects two or more virtualized entities (not shown) of cloud computing environment 50. In other embodiments, network 110 may connect various cloud deployment models (e.g., a hybrid cloud). In an example, server 102 and device 122 execute within a private cloud (not shown) and device 121 originates a hypertext transfer protocol (HTTP) to initiate the execution of an app within a public cloud (not shown). Network 110 communicates the HTTP request to the private cloud where server 102 identifies a version of the app to execute and server 102 utilizes network 110 to execute the identified version of the app in the public cloud.

Device 120 and device 122 may be laptop computers, tablet computers, netbook computers, personal computers (PC), desktop computers, personal digital assistants (PDA), smart phones, wearable devices (e.g., digital eyeglasses, smart glasses, a smart watch), or any programmable computer systems known in the art. In certain embodiments, server 102, device 120, and device 121 represent computer systems utilizing clustered computers and components (e.g., database server computers, application server computers, etc.) that act as a single pool of seamless resources when accessed through network 110, as is common in data centers and with cloud-computing applications. In general, server 102, device 120, and device 121 are representative of any programmable electronic device or combination of programmable electronic devices capable of executing machine readable program instructions and communicating with users of server 102, device 120, and device 121, via network 110. Server 102, device 120, and device 121 may include components, as depicted and described in further detail with respect to FIG. 4, in accordance with embodiments of the present invention.

In an embodiment, user interface (UI) 121 and/or UI 123 may be a graphical user interface (GUI) or a web user interface (WUI) and UI 121 and/or UI 123 can display text, documents, forms, web browser windows, user options, application interfaces, and instructions for operation; and include the information, such as graphics, text, and sound that a program presents to a user. In addition, in one scenario, UI 121 and/or UI 123 controls sequences/actions that the owner/developer of an app employs to create and/or modify a version of the app. In another scenario, UI 121 and/or UI 123 controls sequences/actions of a user that initiate the execution of a version of an app.

In some embodiments, a user of device 120 and/or device 122 can interact respectively with UI 121 and/or UI 123 via a singular device, such as a touch screen (e.g., display) that performs both input to a GUI/WUI, and as an output device (e.g., a display) presenting a plurality of icons associated with apps and/or images depicting one or more executing software applications. In other embodiments, a software program (e.g., a web browser) can generate UI 121 and/or UI 123 operating within the GUI environment of device 120 and/or device 122. In various embodiments, UI 121 and/or UI 123 may receive input responsive to respective users of device 120 and/or device 122 utilizing natural language, such as writing words or speaking words, that device 120 and/or device 122 identifies as information and/or commands.

Figure 2:
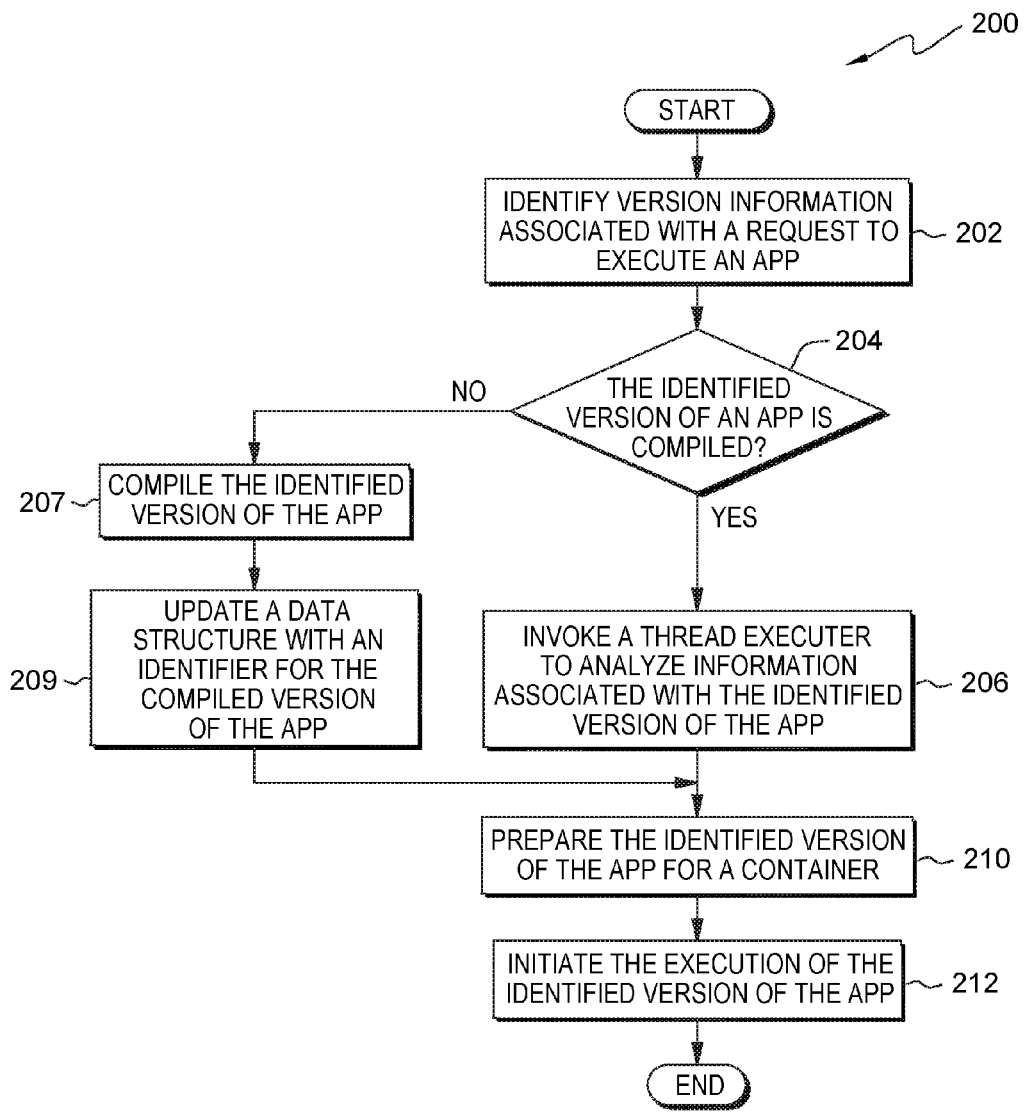
FIG. 2 is a flowchart depicting operational steps of a code revision management program for processing a software application that includes revision control information, in accordance with an embodiment of the present invention.

FIG. 2 is a flowchart depicting the operational steps of CRM program 200, a program that identifies revision control information within a request to execute an app and enables two or more versions of the same app to execute within a software container accordance with embodiments of the present invention.

In step 202, CRM program 200 identifies version information associated with a request to execute an app. In one embodiment, server 102 acts as a gateway and CRM program 200 analyzes a HTTP request to execute an app to identify version (e.g., revision) information associated with the app. In one example, CRM program 200 identifies version information (e.g., RID data) within a HTTP request (e.g., within a HTTP header) initiated by UI 121 (e.g., a WUI) of device 120 to execute an app. In some embodiments, CRM program 200 identifies version information and/or RID data in information communicated with a request to execute an app. In an example, CRM program 200 determines that another computer program (not shown) requests that an app is executed. Utilizing message-oriented middleware, the other computer program identifies to CRM program 200 the version of the app to execute. In another embodiment, CRM program 200 may receive a request to execute an app and identifies metadata, in the form of a unique identifier (e.g., a UUID), to obfuscate the version control information of the app.

In an alternative embodiment, CRM program 200 receives a request and/or message that is routed to server 102 via a monitoring program and/or networking daemon of cloud computing environment 50. If CRM program 200 determines that an app associated with the received request and/or message utilizes multi-version support, then CRM program 200 processes the request to execute the app and identifies the version information of the request and/or message. If CRM program 200 does not identify and/or receive version control information associated with a request to execute an app, then CRM program 200 terminates and returns control to initiate the execution of the app to an agent and/or scheduler (not shown) of cloud computing environment 50.

In decision step 204, CRM program 200 determines whether the identified version of an app is compiled. In one embodiment, CRM program 200 determines that the identified version of an app is compiled based on identify the version information (e.g., RID data) of the requested app is included in an instance of associative array 105. In another embodiment, CRM program 200 determines that the identified version of an app is compiled based on identify the unique identifier associated with a request version of the app is included in an instance of associative array 105. In an alternative embodiment, CRM program 200 does not identify a version of an app that is compiled. In one scenario, CRM program 200 identifies a null value or an undefined value, such as "???" is assigned to a compiled code element for a requested version of an app, thereby indicating that a requested version of an app is not compiled. In another scenario, CRM program 200 does not identify a compiled code element for a requested version of an app within associative array 105. In response to determining that the identified version of the requested app is compiled (Yes branch, decision step 204), CRM program 200 invokes a thread executer to analyze information associated with the identified version of the app (step 206).

In step 206, CRM program 200 invokes a thread executer to analyze information associated with the identified version of the app. In one embodiment, CRM program 200 accesses information within an instance of associative array 105 to determine which thread executer (e.g., TEA) included in TEAs 106 is utilized for a requested app. In one example, CRM program 200 invokes a TEA to validate that a server selected to execute a requested version of the app can execute the app and that the file path to access the code of the requested version of the app is valid. In another example, CRM program 200 invokes a TEA to identify environmental variables and/or constraints associated with the requested version of the app.

Referring to decision step 204, responsive to determining that the identified version of an app is not compiled (No branch, decision step 204), CRM program 200 compiles the identified version of the app.

In step 207, CRM program 200 compiles the identified version of the app. In one embodiment, CRM program 200 accesses an instance of associative array 105 to determine one or more code modules and/or libraries stored in code library 104 that are associated with the requested version of the app. CRM program 200 also identifies whether the accessed instance of associative array 105 includes a unique identifier for the RID data of the requested version of the app. In some embodiment, if CRM program 200 determines that associative array 105 includes a unique identifier associated with the requested version of the app, then CRM program 200 compiles the code for the app. In one scenario, CRM program 200 includes a native compiler associated with the code of the requested app and compiles the version of the requested app. In some scenarios, CRM program 200 does not include a native compiler associated with the code of the requested app. CRM program 200 activates an IDE stored in storage 103 to compile the identified version of the app utilizing the identified one or more modules included in code library 104. In other scenarios, CRM program 200 does not include a native compiler associated with the code of the requested app. CRM program 200 utilizes network 110 to access an IDE with cloud computing environment 50 to compile the identified version of the app utilizing the identified one or more modules included in code library 104.

In other embodiments, if CRM program 200 determines that associative array 105 utilizes a unique identifier for the RID of the requested version of the app, then CRM program 200 initiates an instance of SCA program 300 to obtain a unique identifier for the requested version of the app, prior to compiling the app. In an alternative embodiment, CRM program 200 communicates with server 102 to obtain a unique identifier for the requested version of the app, prior to compiling the app. In response to CRM program 200 obtaining a unique identifier for the requested version of the app, CRM program 200 compiles the requested version of the app.

In step 209, CRM program 200 updates a data structure with an identifier for the compiled version of the app. In one embodiment, CRM program 200 updates an instance of associative array 105 to include information associated with the compiled code of the requested version of the app. In one scenario, CRM program 200 updates an instance of associative array 105 with a unique identifier that corresponds to the compiled source code of the requested version of the app. In another scenario, CRM program 200 updates an instance of associative array 105 with a unique identifier that corresponds to the RID (e.g., RID data) of the requested version of the app. In this scenario, CRM program 200 updates an instance of associative array 105 with an identifier, such as the file name, of the compiled code of the requested version of the associate array.

In a further embodiment, CRM program 200 utilizes one or more other aspects of SCA program 300 to generate a program loader (e.g., class-loader) that is identified and included in an update to an instance of associative array 105 that is associated with the requested version of the app.

In step 210, CRM program 200 prepares the identified version of the app for a container. In some embodiments, CRM program 200 queries server 102 to determine that a container for another version of the requested app is active in cloud computing environment 50. An app can be active within a container without executing (e.g., the app is paused). In one embodiment, CRM program 200 utilizes information associated with the requested version of the app that is included in associative array 105 and the analysis of information by a thread executer (e.g., a TEA) of TEAs 106, associated with the app, to identify a program loader (e.g., class-loader) for the requested version of the app. CRM program 200 utilizes the identified program loader to copy an instance of the compiled code of the requested version of the app to the determined container.

In another embodiment, if CRM program 200 determines, based on information in associative array 105, that the requested version of an app is not associated with a program loader. In this embodiment, CRM program 200 utilizes a routine/program (not shown) included in storage to generate a loader program (e.g. class-loader) for the requested version of the app. In one scenario, CRM program 200 utilizes the information associated with the generated program loader to update associative array 105 with the new information and in response, CRM program 200 prepares the requested version of the app for the container that includes another version of the app. In another scenario, CRM program 200 determines that routine/program that generated the program loader also updated associative array 105 with the new information and in response, CRM program 200 prepares the requested version of the app for the container that includes another version of the app.

In an alternative embodiment, CRM program 200 queries server 102 and determines that cloud computing environment 50 does not include an active container associated with the app. In response to server 102 determining that cloud computing environment 50 does not include an active container associated with the app, CRM program 200 utilizes a TEA associated with the app to build and/or stage a container for the requested version.

In step 212, CRM program 200 initiates the execution of the identified version of the app. In one embodiment, server 102 hosts the identified app. CRM program 200 initiates the execution of (e.g., stages) the prepared version of the app in the container on server 102. In some embodiments, CRM program 200 determines, based on information in the HTTP request for the identified version of the app, that a location within cloud computing environment 50 hosts the app. CRM program 200 utilizes one or more messaging protocols, such as NATS or advanced message queuing protocol (AMPQ) to communicate with the location within cloud computing environment 50 that hosts the app to execute the identified version of the app. CRM program 200 includes the multi-version support information in the communication. CRM program 200 may also transmit the container configured for multi-version support of the app to the location within cloud computing environment 50 that hosts the app. In other embodiments, CRM program 200 receives information from server 102, that identifies the location within cloud computing environment 50 that hosts the app based on information communicated via message oriented middleware, NATS, AMPQ, etc., during the request to execute the app. CRM program 200 responds the location within cloud computing environment 50 that hosts the app to execute the requested version of the app. CRM program 200 may also transmit the container configured for multi-version support of the app to the location within cloud computing environment 50 that hosts the app.

Figure 3:
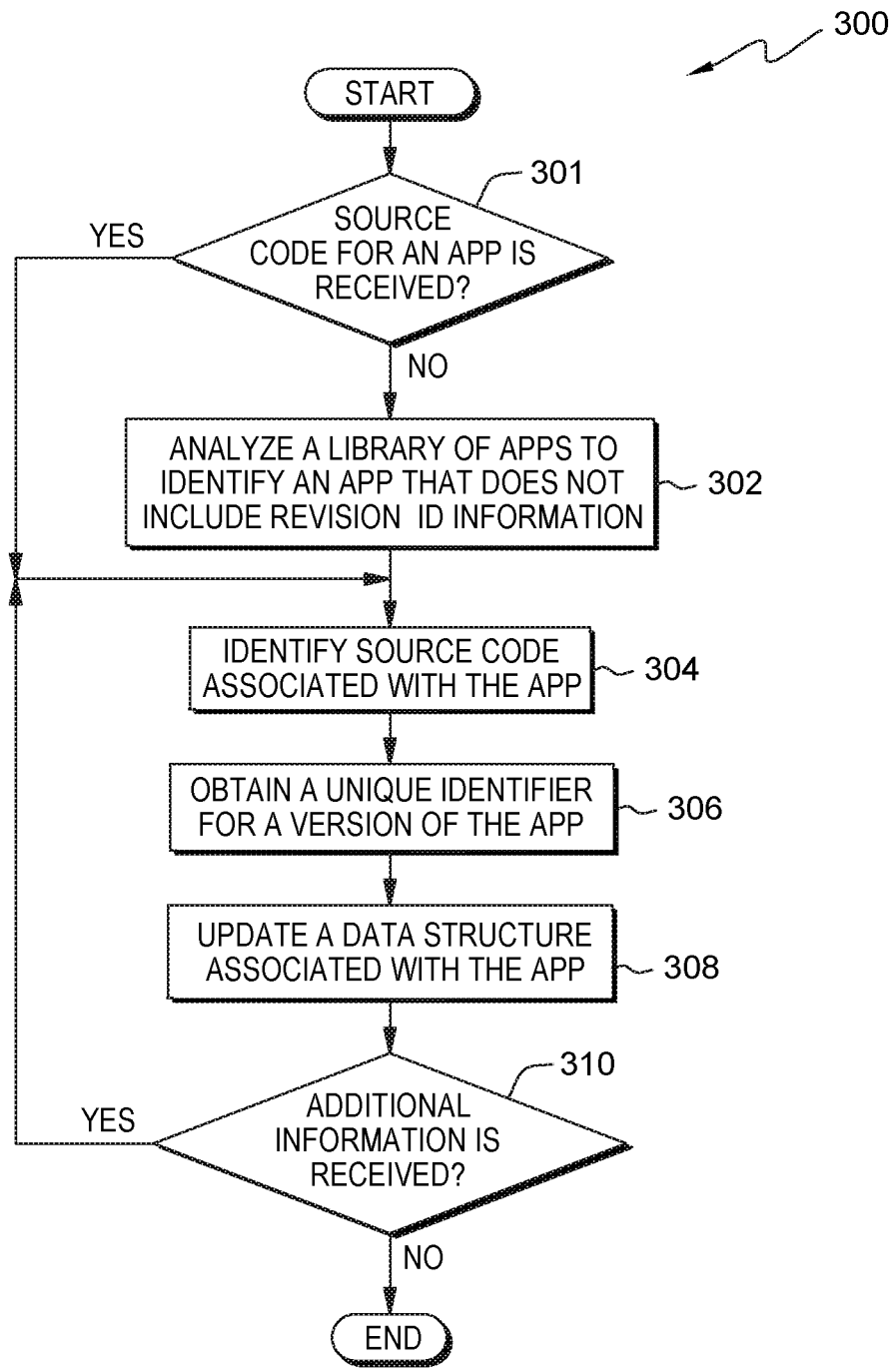
FIG. 3 is a flowchart depicting operational steps of a program for determining scripts to utilize for validation, in accordance with an embodiment of the present invention.

FIG. 3 is a flowchart depicting operational steps of SCA program 300, a program that obtains a unique identifier for a revision of an app and SCA program 300 associates the unique identifier to the app via a data structure, in accordance with embodiments of the present invention. SCA program 300 can also link other aspects of the app, such as binary/compiled code file, a program loader object/function, and/or a buildpack to a revision of the app via the data structure. In an embodiment, SCA program 300 interfaces with CRM program 200 to communicate information. In some embodiments, SCA program 300 may execute concurrently CRM program 200. In various embodiments, different instances of SCA program 300 may execute concurrently in response to two or more software developers creating different revisions for the same app. In an alternative embodiment, SCA program 300 scans a library of source codes of apps to identify source codes of one or more apps that do not include revision control information.

In decision step 301, SCA program 300 determines whether source code for an app is received. In one embodiment, SCA program 300 determines that source code for an app is received based on identifying new source code for an app that is included on code library 104 of server 102. In another embodiment, SCA program 300 determines that source code for an app is received based an owner/developer of device 122 utilizing an IDE that interfaces with SCA program 300. In some embodiments, SCA program 300 determines that source code for an app is received based on identifying that CRM program 200 initiates to compile source code of an app that includes an RID; however, associative array 105 does not include unique identifier (e.g., UUID) for the RID of the app. In a further embodiment, SCA program 300 analyzes one or more data structures (e.g., associative array 105, a file structure of storage 103) and/or communications of an IDE to determine that source code for an app is received.

In an alternative embodiment, if SCA program 300 does not determine that source code for an app is received (No branch, decision step 301), then SCA program 300 analyzes a library of apps to identify an app that does not include revision ID information (step 302).

In step 302, SCA program 300 analyzes a library of apps to identify an app that does not include revision ID information. In some embodiments, SCA program 300 analyzes code library 104 of server 102 to identify an app that does not include revision ID information. In one scenario, SCA program 300 determines that code library 104 includes two or more versions of an app based on metadata associated with the compiled code of the app. In another scenario, SCA program 300 determines that code library 104 includes two or more versions of an app based on information (e.g., a comment, a version control statement of a programming language, etc.) within source code of the app. In another embodiment, SCA program 300 compares information related to apps included in associative array 105 to files included in code library 104 to determine which apps and/or versions of apps (e.g., source code, compiled code, etc.) are not identified within associative array 105.

In other embodiments, SCA program 300 analyzes code library accessible via network 110, such as in device 122 or another node/server of cloud computing environment 50 to identify an app that does not include revision ID information. In various embodiments, SCA program 300 transmits a message, such as an e-mail, a messaging function of an IDE (not shown), or via UI 123 to a, owner/developer associated with the app to obtain revision ID information to associate with the identified app.

In an alternative embodiment, SCA program 300 identifies an app stored within cloud computing environment 50 that do not include revision ID information based on analyzing HTTP requests to execute the app that are communicated via network 110. In an example, a user of device 120 utilizes UI 121 (e.g., a web browser) to initiate an app that executes within cloud computing environment 50. SCA program 300 monitors HTTP requests communicated via network 110 to identify HTTP request that do not include revision control information. In another example, SCA program 300 receives copies HTTP requests via network 110 that do not include (e.g., are filtered based on) revision control information from a program and/or monitoring function of cloud computing environment 50 (not shown). SCA program 300 identifies apps that do not include revision control information based on the received copies of HTTP requests. SCA program 300 may query an owner/developer of an app that does not include multi-version support, whether the owner/developer utilizes SCA program 300 to update the app to include multi-version (e.g., RID) support.

Referring to decision step 301, responsive to determining that source code of an app is received (Yes branch, decision step 301), SCA program 300 identifies source code associated with the app (step 302).

In step 304, SCA program 300 identifies source code associated with the app. In one embodiment, SCA program 300 may identify one or more versions of source code of the app and/or one or more modules that are included in the source code corresponding to each version of the app. In one embodiment, SCA program 300 identifies the source code and storage location for the source code associated with the app based on SCA program 300 identifying the received source code of the app. In some embodiments, SCA program 300 identifies source code of the app based on information associated with a library of apps (e.g., code library 104). In other embodiments, SCA program 300 identifies source code associated with the app based on information from an IDE (not shown) utilized to develop the app. In various embodiments, SCA program 300 receives information from an owner/developer of an app that identifies the source code, one or more code modules, and/or libraries that are included in each version of the app. The information received from the owner/developer of the app may include a specific structure of the RID data utilized to identify versions of the app.

In step 306, SCA program 300 obtains a unique identifier for a version of the app. In one embodiment, SCA program 300 obtains a unique identifier for each version (e.g., RID)

of an app. In an example, SCA program 300 queries server 102 and obtains one or more UUIDs. In another example, SCA program 300 obtains a unique identifier for the code (e.g., source code, compiled code, etc.) of the app from an IDE used to develop the app. In another embodiment, SCA program 300 obtains a unique identifier that is associated with compiled code of a RID of an app. In some embodiments, SCA program 300 may obtain a unique identifier to assign to source code of a RID of an app. In other embodiments, SCA program 300 may obtain a unique identifier to associate a program loader to a RID of the app. In various embodiments, SCA program 300 may obtain unique identifiers for one or more elements included in associative array 105 for an app.

In an alternate embodiment, SCA program 300 determines whether the identified source code is a module as opposed to a set of source code that comprises the app. In response to determining that the identified source code is a single module of the app, SCA program 300 delays obtaining a unique identifier for the source code of the app until each module of the set of source code that comprises the app is identified. In addition, SCA program 300 determines which RID is associated with the identified set of source code of the app. In some embodiments, SCA program 300 is constrained to delay the determination of a RID associated with the identified set of source code of the app until input is received from a owner/developer of the app (discussed in further detail with respect to decision step 310). In an example, SCA program 300 queries a developer that utilizes device 122 to obtain information that includes an indication as to which one or more source code modules include in code library 104 is utilized for a RID of an app.

In step 308, SCA program 300 updates a data structure associated with the app. In one embodiment, SCA program 300 updates an instance of associative array 105 that is associated with the app. In some embodiments, SCA program 300 determines that multiple instances of associative array 105 are included in storage 103, where each instance of associative array 105 corresponds to an app. In various embodiments, SCA program 300 updates an instance an associative array or portion of an associative array corresponding an identified app with information that includes but is not limited to: RID data of the app, one or more unique identifiers, and an identity (e.g., file name) of compiled code. SCA program 300 may also update an associative array to include: a list of source code, code modules, and libraries included in compiled code of a version (e.g., RID) of the app, a buildpack associated with a version of an app, a program loader/runtime object (e.g., class-loader) related to a RID of the app, etc. An example of information that may be included and/or updated by SCA program 300 is discussed in further detail with respect to FIG. 4.

In decision step 310, SCA program 300 determines whether additional information is received. In one embodiment, SCA program 300 determines that additional information is received from an owner/developer of an app based on SCA program 300 executing in response to input from an IDE during the development of the app. In another embodiment, SCA program 300 determines that additional information is received from an owner/developer of an app based on input received from UI 123 of device 122. In response to SCA program 300 determining that additional information is received, SCA program 300 loops (Yes branch, decision step 310) to step 304. In some embodiments, SCA program 300 receives information associated with programming of a version of an app. In other embodiments, SCA program 300 receives information to include in associative array 105.

Alternatively, if SCA program 300 does not receive additional information (No branch, decision step 310), then SCA program 300 terminates.

Figure 4:
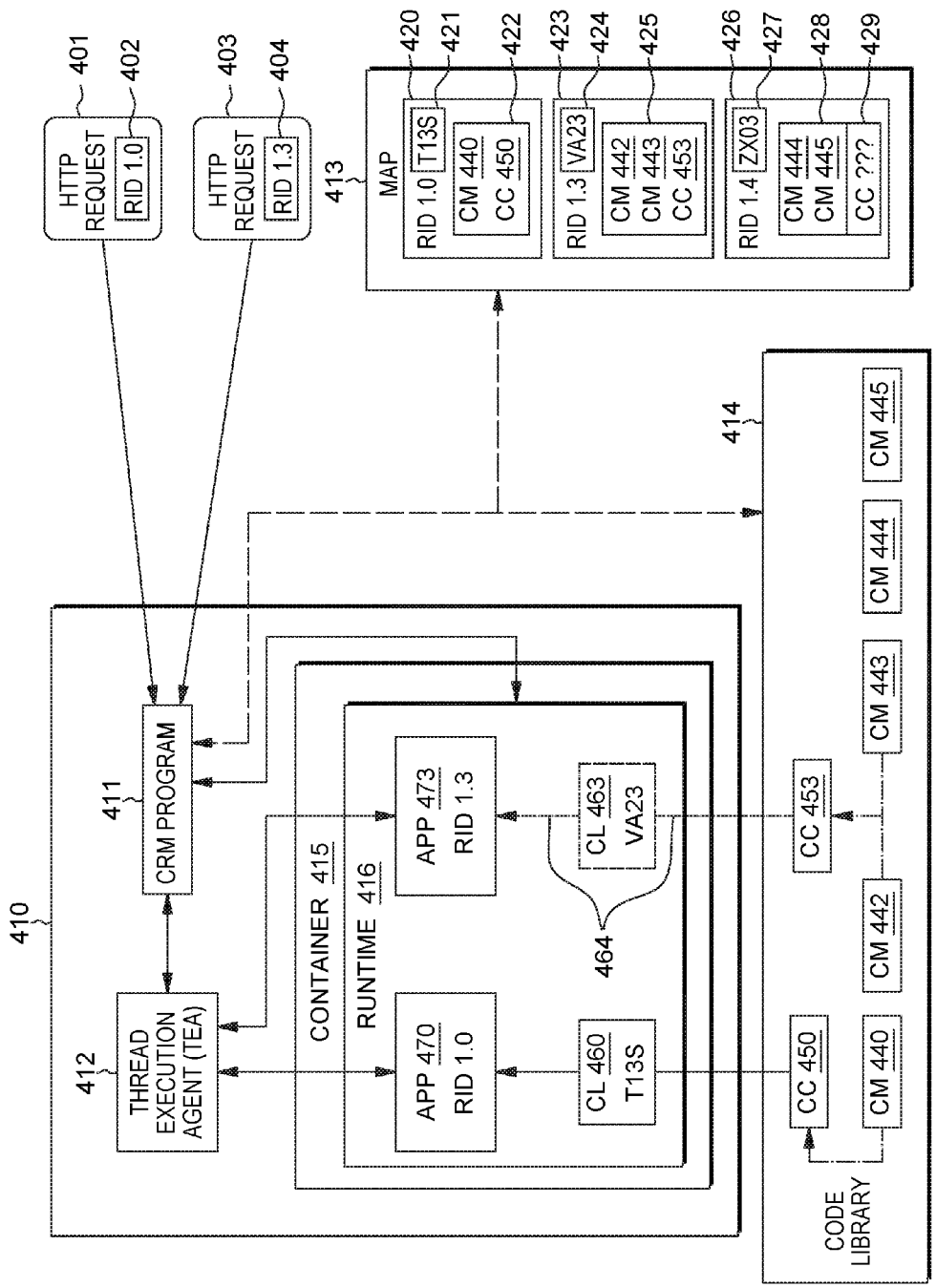
FIG. 4 is an illustrative example of a code revision management program responding to requests to execute an application, where the execution request version control information, in accordance with at least one embodiment of the present invention.

FIG. 4 is an illustrative example of various embodiments of the present invention. For example, some portions of FIG. 4 are representative of one or more embodiments of elements of environment 100, such as MAP 413 is representative of associative array 105, code library 414 is representative of code library 104, and CRM program 411 is representative of CRM program 200. Other portions of FIG. 4 are representative of at least one embodiment of elements within an abstraction layer of a cloud computing environment (discussed in further detail with respect to FIG. 7).

In an example (referring to FIG. 1), a user of device 120 and another user of device 122 initiate an app via UI 121 and UI 123 respectively. The app is initiated via HTTP request 401 and HTTP request 403 respectively transmitted from device 120 and device 122 to cloud computing environment 50, which routes HTTP request 401 and HTTP request 403 to server 102. With respect to the illustrative example, HTTP request 401 is received before HTTP request 403. In an example, a developer of the app is evaluating various versions of the app and includes revision control information (e.g., a revision control identifier (RID)), such as RID 1.0 of callout 402 of HTTP request 401, and revision control information RID 1.3 of callout 404 of HTTP request 403. In addition to RID data, HTTP request 401 and HTTP request 403 include additional information provided by the users of device 120 and device 122. In an example, additional information provided by user of the app may include: authentication information, information in the form of a natural language query, an invoice number, etc.

In an illustrative embodiment, element 410, CRM program 411, TEA 412, MAP 413, code library 414, container 415, runtime 416, CL 460, app 470, and app 473 are included in and/or execute on server 102 (previously discussed). In this illustrative embodiment, HTTP request 401 and HTTP request 403 are received by element 410 and are processed by CRM program 411.

In an embodiment, CRM program 411 (e.g., an instance of CRM program 200) analyzes HTTP request 401 and HTTP request 403 and determines that two versions of an app are requested to execute based on information included in callout 402 (e.g., RID 1.0) and callout 404 (e.g., RID 1.3). CRM program 411 accesses MAP 413 via a communication channel (log dashed lines) to identify one or more elements that are utilized execute the version of the app associated with RID 1.0 and RID 1.3.

In an embodiment, MAP (e.g., MAP structure) 413 depicts an embodiment of associative array 105 (discussed in further detail with respect to FIG. 1) that is associated with the versions of an app initiated by HTTP request 401 and HTTP request 403. In the illustrative example, MAP 413 include information associated with three version of the app as identified by elements 420, 423, and 426 that correspond to RID 1.0, RID 1.3, and RID 1.4. In the illustrative example, MAP 413 includes a unique identifier: callout 421 (e.g., T13S), callout 424 (e.g., VA23), and callout 427 (e.g., ZX03) that corresponds to RID 1.0 of element 420, RID 1.3 of element 423, and RID 1.4 of element 426 of the app.

In the illustrative example, each RID of MAP 413 also includes information associated with source code (e.g., one or more files/modules) and/or an executable file corresponding to a RID of the app as identified within callout 422 of element 420, callout 425 of element 423, and callout 428 of element 426 of the app. In an embodiment, each RID of MAP 413 indicates, via callout 422, callout 425, and callout 428, one or more source code files/code modules (CMs) stored in code library 414 is utilized to compile a version of the app corresponding to RID 1.0, RID 1.3, and RID 1.4. In the illustrative example, callout 422 corresponds to RID 1.0 that dictates the use of CM 440, callout 425 corresponds to RID 1.3 that dictates the use of CM 442 and CM 443, and callout 428 corresponds to RID 1.4 that dictates the use of CM 444 and CM 445 to generate compiled code.

In an embodiment, MAP 413 may also include an indication associated with an executable/binary object/file identified as compiled code (CC) within code library 414. In this illustrative example, on or more CMs are compiled, as signified by the dash-dotted lines within code library 414, generate a CC for a version (e.g., RID) of the app. Callout 422 of element 420 also indicates that CM 440 was compiled to generate CC 450 for RID 1.0 of the app. In addition, callout 425 of element 423 also indicates that CM 442 and CM 443 were compiled to generate CC 453 for RID 1.3 of the app.

However, MAP 413 also includes callout 429 within element 426. In the illustrative example, callout 429 includes an undefined value, "???," associated with the CC identifier corresponding to RID 1.4. In an embodiment, the undefined value of "???" indicates that CM 444 and CM 445 associated with RID 1.4 are not compiled. In an example referring to FIG. 2, CRM program 200 accesses associative array 105 in response to a HTTP request to execute RID 1.4 of the app. In response to CRM program 200 detects a value of "???" for the value associated with the CC identifier (e.g., callout 429) of element 426 and triggers the "No" branch of Decision step 204. Referring to FIG. 2 step 207 and step 209, CRM program 200 compiles CM 444 and CM 445 to generate an executable file, assign a value to a CC identifier corresponding to RID 1.4, and update the associative array (e.g., MAP 413) to replace the "???" identifier of callout 429 with an assigned CC identifier.

In some embodiments, one or more class-loader (CLs) are included in container 415 in response to TEA 412 executing a buildpack (not shown) associated with a request to execute an app (e.g., HTTP request 401 and HTTP request 403). In an example, element 410 include a class-loader cache set (not shown) that includes a list of the class-loaders that are utilized by an app. Referring to HTTP request 401, CRM program 411 determines that a class-loader (e.g., CL 460) is utilized by runtime 416 to load compiled code for app 470 (RID 1.0). CRM program 411 identifies that CL 460 is utilized by a request to execute and instance of version RID 1.0 of the app based on CL 460 including unique identifier "T13S", which corresponds to the unique identifier of callout 421, associated with RID 1.0 of element 420 of MAP 413. CL 460 accesses code library 414 to load a copy of CC 450 to runtime 416 of container 415. TEA 412 utilizes CL 460 to stage and execute app 470, RID 1.0.

However, CRM program 411 determines that runtime 416 does not include a class-loader for app 473, RID 1.3 as signified by dashed box and associated lines. CRM program 411 executes a routine/program (not shown) to generate a class-loader for HTTP request 403, RID 1.3. CRM program 411 utilizes the unique identifier associated with RID 1.3 of the app in MAP 413, to include the unique identifier of callout 423, "VA23", with the generated class-loader to generate CL 463. TEA 412 and/or CMR program 200 includes CL 463 in a class-loader cache set associated with the requested app. In response, CRM program 411 includes CL 463 in runtime 416, enabling CL 463 to establish communication path 464. CL 463 utilizes communication path 464 to access code library 414 and loads a copy of CC 453 to runtime 416 to generate app 473, RID 1.3 in response to HTTP request 403.

TEA 412 executes app 470 (RID 1.0) and app 473 (RID 1.3) within container 415. TEA 412 routes additional information (identified in an example above) corresponding to HTTP request 401 and HTTP request 403 for respective processing by app 470 and app 473.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
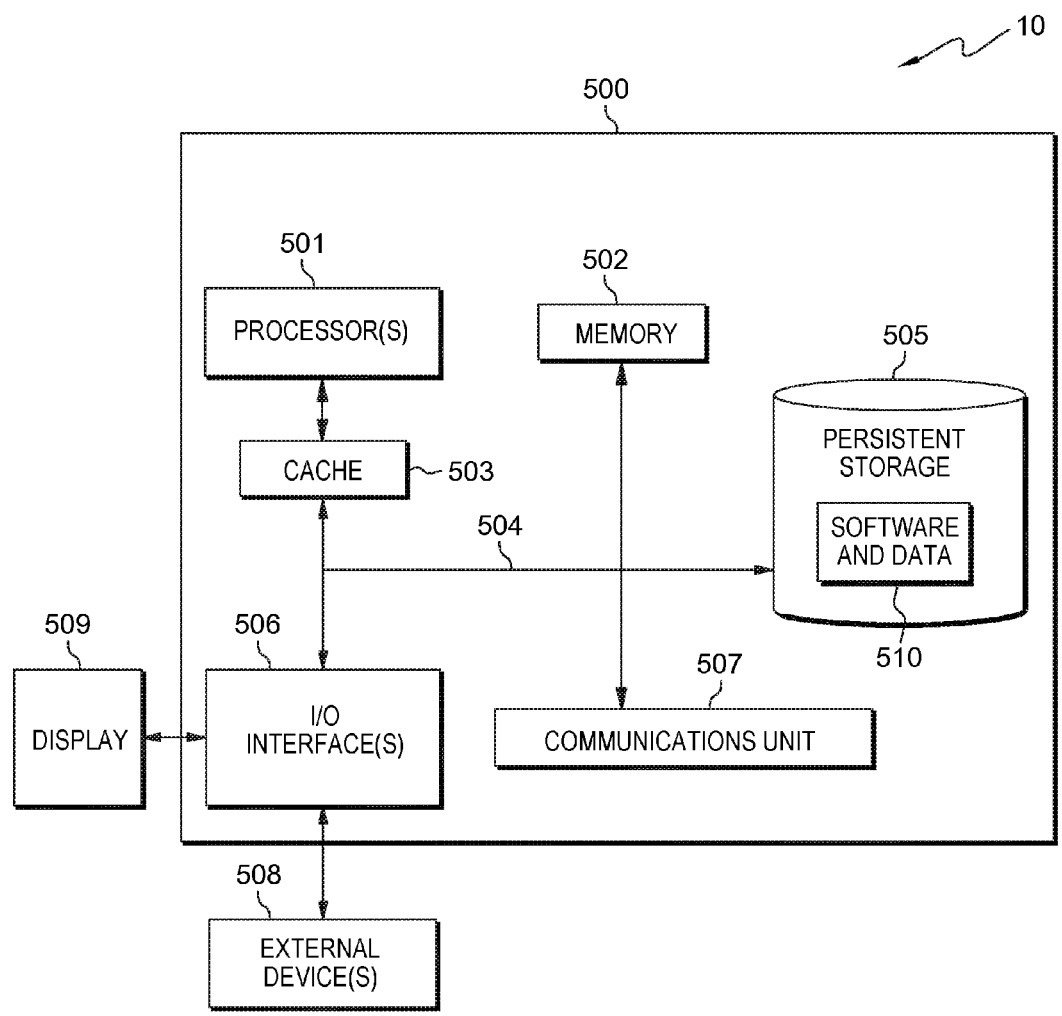
FIG. 5 depicts a cloud computing node, according to an embodiment of the present invention.

FIG. 5 is representative of various computing devices cloud computing node 10 (discussed in is only one example of a suitable cloud computing node and is not intended to suggest any limitation as to the scope of use or functionality of embodiments of the invention described herein. Regardless, cloud computing node 10 is capable of being implemented and/or performing any of the functionality of embodiments of the invention described herein.

Regardless, cloud computing node 10 is capable of being implemented and/or performing any of the functionality set forth hereinabove. In example embodiments, cloud computing node 10 is representative of server 102. In various embodiments, cloud computing node 10 may be representative of hardware physical instances of hardware elements and/or computing devices (e.g., RISC based servers 62, servers 63, etc.) and/or virtualized instance of hardware elements, computing devices (e.g., virtual servers 71, virtual storage 72, virtual networks 73, etc.) discussed further with respect to FIG. 7.

As shown in FIG. 5 in some embodiments, computer system 500 in cloud computing node 10 is shown in the form of a general-purpose computing device, such as server 102. In other embodiments, computer system 500 is representative of one or more computing devices connected to cloud computing environment 50, such as device 120 and device 122. Computer system 500 is an example of a system that includes software and data 512. Computer system 500 includes processor(s) 501, memory 502, cache 503, persistent storage 505, communications unit 507, input/output (I/O) interface(s) 506, and communications fabric 504.

Communications fabric 504 provides communications between memory 502, cache 503, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses, such as a peripheral component interconnects (PCI) bus, or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processor(s) 501 by holding recently accessed data, and data near recently accessed data, from memory 502.

Program instructions and data used to practice embodiments of the present invention may be stored in persistent storage 505 and in memory 502 for execution by one or more of the respective processor(s) 501 via cache 503. In an embodiment, persistent storage 505 includes a magnetic hard disk drive. Alternatively, or in addition to a magnetic hard disk drive, persistent storage 505 can include a solid-state hard drive, a semiconductor storage device, a read-only memory (ROM), an erasable programmable read-only memory (EPROM), a flash memory, or any other computer readable storage media that is capable of storing program instructions or digital information. In an embodiment, storage 103 is included in persistent storage 505.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505. Software and data 512 are stored in persistent storage 505 for access and/or execution by one or more of the respective processor(s) 501 via cache 503 and one or more memories of memory 502. With respect to server 102, software and data 512 includes code library 104, associative array 105, thread execution agents (TEAs) 106, code revision management (CRM) program 200, source code analysis (SCA) program 300, and various programs (not shown). With respect to device 120 and device 122 software and data 512 respectively includes UI 121 and UI 122 and various programs and data (not show).

Communications unit 507, in these examples, provides for communications with other data processing systems or devices, including resources of server 102, device 120, and device 122. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507.

I/O interface(s) 506 allows for input and output of data with other devices that may be connected to each computing system, such as an instance of node 10. For example, I/O interface(s) 506 may provide a connection to external device (s) 508, such as a keyboard, a keypad, a touch screen, and/or some other suitable input device. External device(s) 508 can also include portable computer readable storage media, such as, for example, thumb drives, portable optical or magnetic disks, and memory cards. Software and data 512 used to practice embodiments of the present invention can be stored on such portable computer readable storage media and can be loaded onto persistent storage 505 via I/O interface(s) 506. I/O interface(s) 506 also connect to display 509.

I/O interface(s) 506 also allows one or more devices to interact with computer system/server 500; and/or any devices (e.g., network card, modem, etc.) that enable computer system/server 500 to communicate with one or more other computing devices. Such communication can occur via I/O interface(s) 506. Still yet, computer system/server 500 can communicate with one or more networks, such as a local area network (LAN), a general wide area network (WAN), and/or a public network (e.g., the Internet) via communications unit 507. It should be understood that although not shown, other hardware and/or software components could be used in conjunction with computer system/server 500. Examples, include, but are not limited to: microcode, device drivers, redundant processing units, external disk drive arrays, RAID systems, tape drives, and data archival storage systems, etc.

Display 509 provides a mechanism to display data to a user and may be, for example, a computer monitor. Display 509 can also function as a touch screen, such as the display of a tablet computer or a smartphone.

Figure 6:
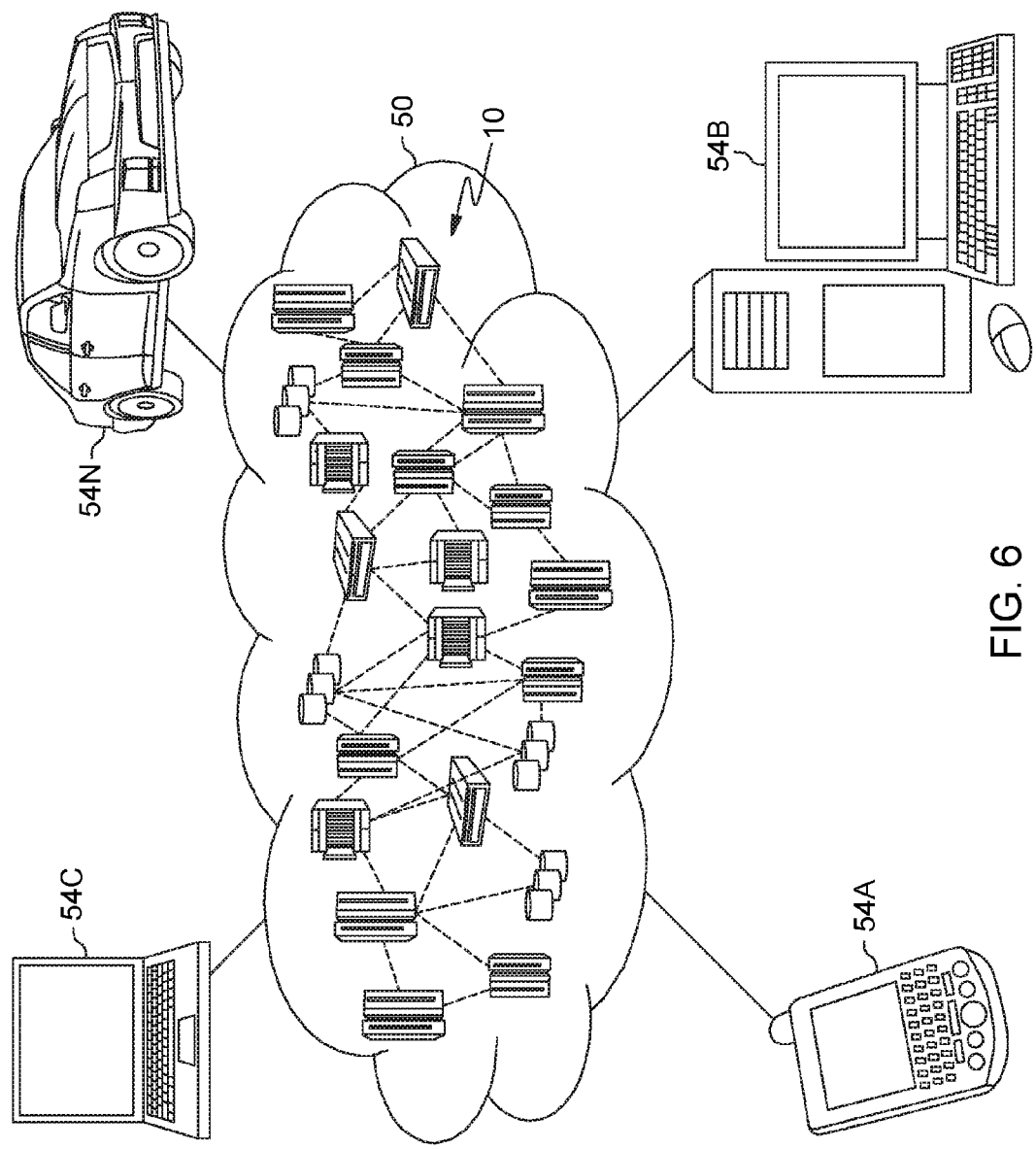
FIG. 6 depicts a cloud computing environment, according to an embodiment of the present invention.

FIG. 6 depicts illustrative cloud computing environment 50. As shown, cloud computing environment 50 includes one or more cloud computing nodes 10 with which local computing devices used by cloud consumers, such as, for example, personal digital assistant (PDA) or cellular telephone 54A (e.g., device 120), desktop computer 54B, laptop computer 54C (e.g., device 122), and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
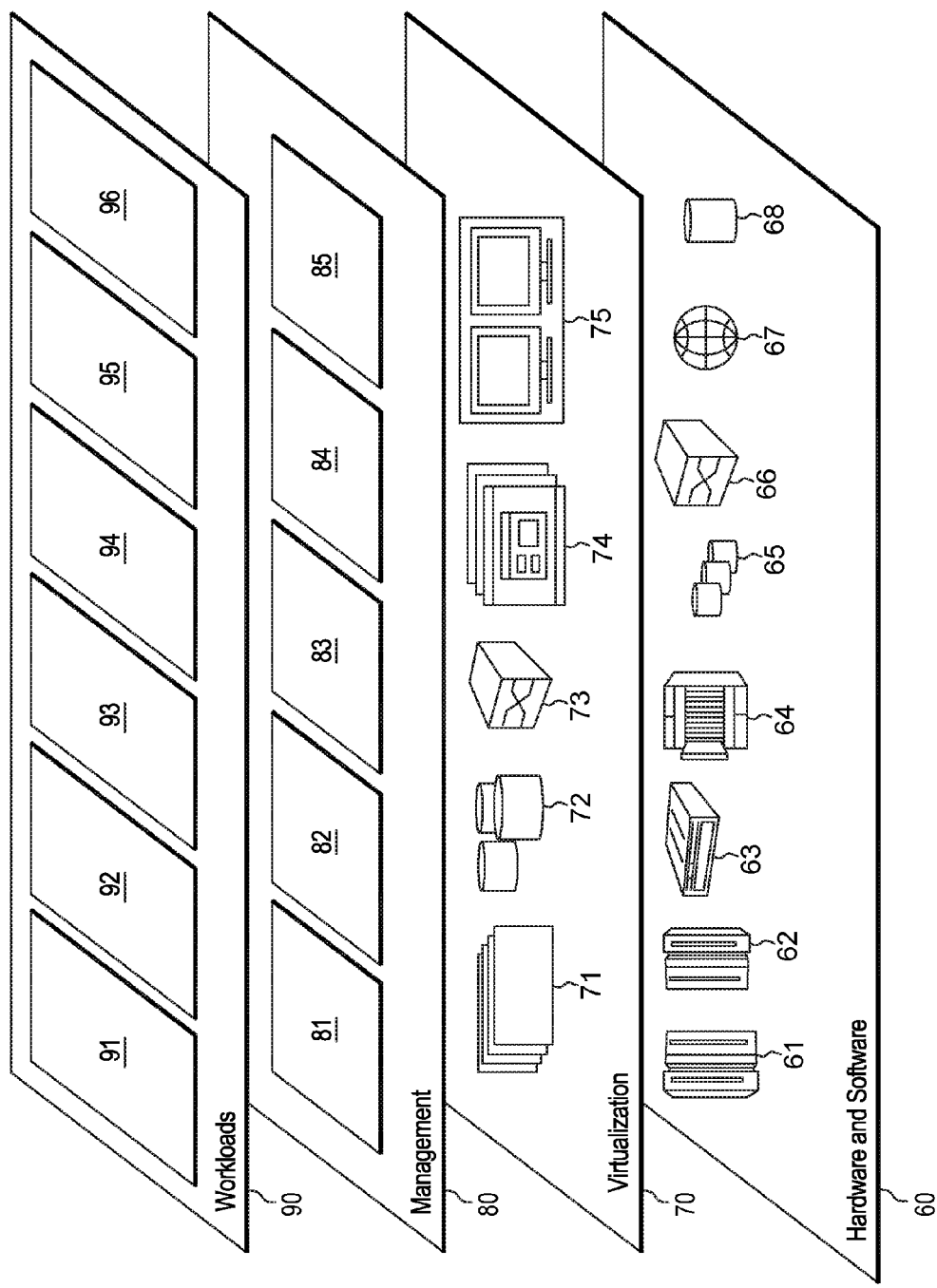
FIG. 7 depicts a set of functional abstraction layers of a cloud computing environment, according to an embodiment of the present invention.

Referring now to FIG. 7, a set of functional abstraction layers provided by cloud computing environment 50 (FIG. 6) is shown. It should be understood in advance that the components, layers, and functions shown in FIG. 1 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In an example, one or more aspects of CRM program 200 are implemented via virtual applications and operating systems 74.

In one example, management layer 80 may provide the functions described below. Resource provisioning 81 provides dynamic procurement of computing resources and other resources that are utilized to perform tasks within the cloud computing environment. In an example, resource provisioning 81 includes providing an owner/developer of an app access to SCR program 200 and SCA program 300. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and customer software apps 96 includes one or more apps of a software developer that utilizes multi-version support within the one or more apps.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for executing multiple versions of an application within a networked-computing environment, the method comprising:

identifying, by one or more computer processors, a request to execute an instance of a first version of an application within a networked-computing environment;

determining, by one or more computer processors, that an instance of a second version of the application is active within a first container executing within the networked-computing environment;

accessing, by one or more computer processors, a data structure including information associated with the application to obtain a first set of data corresponding to the first version of the application;

determining, by one or more computer processors, whether the obtained first set of data indicates that the first version of the application is compiled;

in response to determining that the first version of the application is compiled, copying, by one or more computer processors, from a network accessible storage device, one or more executable objects associated with the first version of the application based, at least in part, on the first set of data, to the first container executing within the networked-computing environment;

identifying, by one or more computer processors, the first set of data that corresponds to the first version of the application, wherein the first set of data includes a first information associated with a first program loader and one or more executable objects that correspond to first version of the application;

responsive to identifying that the first data does not include an indication related to one or more executable objects stored on the network accessible storage device that are associated with the first version of the application, identifying, by one or more computer processor, a third information within the data structure that is associated with the first version of the application;

generating, by one or more computer processors, at least one executable object of the one or more executable objects associated with the first version of the application based on the first set of data, and a corresponding fourth information of the generated at least one executable object based, at least in part on the third information within the data structure that is associated with the first version of the application, wherein the at least one executable object is associated with compiled code of the first application;

storing, by one or more computer processors, the generated at least one executable object of the one or more executable objects associated with the first version of the application on the network accessible storage device;

updating, by one or more computer processors, the first set of data within data structure to include the fourth information corresponding to the generated at least one executable object that is associated with the first version of the application, wherein the fourth information includes an indication of a location within the network accessible storage device for the generated at least one executable object and an identifier of the generated at least on executable object; and executing, by one or more computer processors, the copied one or more executable objects associated with the first version that comprise the requested instance of the first version of the application within the first container, executing within the networked-computing environment, in addition to the active instance of the second version of the application while maintaining environmental variables utilized by the active instance of the second version of the application within the executing first container.

2. The method of claim 1:

wherein a request to execute an instance of the application is based, at least in part on a hypertext transfer protocol (HTTP) communication request; and wherein the HTTP communication request includes information that dictates a version of the software to be executed.

3. The method of claim 1:

wherein the instance of the first version of the application is initiated to execute within the first container without restaging the active instance of the second version of the application within the executing first container.

4. The method of claim 1, wherein the data structure includes two or more elements corresponding to a version of the application, and wherein two or more elements corresponding to a version of the application are selected from a set comprising:

version information for at least the first version of the application and the second version of the application;

an indication identifying computer code related to one or more executable objects correspond to at least the first version of the application and the second version of the application;

an indication related to one or more executable objects stored on the network accessible storage device that correspond to at least the first version of the application and the second version of the application; and a unique identifier that corresponds to at least one aspect of at least the first version of the application and the second version of the application.

5. The method of claim 1, further comprising:

responsive to identifying the first information of the first set of data that is associated with the first program loader, executing, by one or more computer processors, the first program loader to load one or more executable objects associated with the first version of the application to the first container executing within the networked-computing environment, wherein loading includes copying, from the network accessible storage device, the one or more executable objects associated with the first version of the application to the first container executing within the networked-computing environment.

6. The method of claim 5, further comprising:

responsive to identifying that the first data does not include the first information associated with the first program loader, initiating, by one or more computer processor, a software routine to generate the first program loader, wherein generating the first program loader includes obtaining a second information that is associated with the first loader program; and updating, by one or more computer processors, the first set of data within data structure to include the second information associated with the first loader program that is associated with the first version of the application.

7. The method of claim 1, further comprising:

determining, by one or more computer processors, that a container is configured for multi-version support for an application:

wherein the multi-version support includes: an additional virtualization layer associated with the container, a runtime associated with the application, and a thread execution agent (TEA) related with the application; and wherein the TEA related to the application identifies information respectively associated with a version of the application.

8. A computer program product for executing multiple versions of an application within a networked-computing environment, the computer program product comprising:

one or more computer readable storage media and program instructions stored on the one or more computer readable storage media, the program instructions readable/executable by one or more computer processors:

program instructions to identify a request to execute an instance of a first version of an application within a networked-computing environment;

program instructions to determine that an instance of a second version of the application is active within a first container executing within the networked-computing environment;

program instructions to access a data structure including information associated with the application to obtain a first set of data corresponding to the first version of the application;

program instructions to determine whether the obtained first set of data indicates that the first version of the application is compiled;

program instruction to respond to determining that the first version of the application is compiled by copying, from a network accessible storage device, one or more executable objects associated with the first version of the application based, at least in part, on the first set of data, to the first container executing with the networked-computing environment;

program instructions identify the first set of data that corresponds to the first version of the application, wherein the first set of data includes a first information associated with a first program loader and one or more executable objects that correspond to first version of the application;

program instructions to respond to identifying that the first data does not include an indication related to one or more executable objects stored on the network accessible storage device that are associated with the first version of the application by identifying a third information within the data structure that is associated with the first version of the application;

program instruction to generate at least one executable object of the one or more executable objects associated with the first version of the application based on the first set of data, and a corresponding fourth information of the generated at least one executable object based, at least in part on the third information within the data structure that is associated with the first version of the application, wherein the at least one executable object is associated with compiled code of the first application;

program instructions to store the generated at least one executable object of the one or more executable objects associated with the first version of the application on the network accessible storage device;

program instructions to update the first set of data within data structure to include the fourth information corresponding to the generated at least one executable object that is associated with the first version of the application, wherein the fourth information includes an indication of a location within the network accessible storage device for the generated at least one executable object and an identifier of the generated at least on executable object; and program instructions to execute the copied one or more executable objects associated with the first version that comprise the requested instance of the first version of the application within the first container, executing within the networked-computing environment, in addition to the active instance of the second version of the application while maintaining environmental variables utilized by the active instance of the second version of the application within the executing first container.

9. The computer program product of claim 8:

wherein a request to execute an instance of the application is based, at least in part on a hypertext transfer protocol (HTTP) communication request; and wherein the HTTP communication request includes information that dictates a version of the software to be executed.

10. The computer program product of claim 8:

wherein the instance of the first version of the application is initiated to execute within the first container without restaging the active instance of the second version of the application within the first container.

11. The computer program product of claim 8, wherein the data structure includes two or more elements corresponding to a version of the application, and wherein two or more elements corresponding to a version of the application are selected from a set comprising:

version information for at least the first version of the application and the second version of the application;

an indication identifying computer code related to one or more executable objects correspond to at least the first version of the application and the second version of the application;

an indication related to one or more executable objects stored on the network accessible storage device that correspond to at least the first version of the application and the second version of the application; and a unique identifier that corresponds to at least one aspect of at least the first version of the application and the second version of the application.

12. The computer program product of claim 8, further comprising:

program instruction to respond to identifying the first information of the first set of data that is associated with the first program loader by executing the first program loader to load one or more executable objects associated with the first version of the application to the first container executing within the networked-computing environment, wherein loading includes program instruction to copy, from the network accessible storage device, the one or more executable objects associated with the first version of the application to the first container executing within the networked-computing environment.

13. The computer program product of claim 12, further comprising:

program instructions to respond to identifying that the first data does not include the first information associated with the first program loader by initiating a software routine to generate the first program loader, wherein program instructions to generate the first program loader includes program instructions to obtain a second information that is associated with the first loader program; and program instructions to update the first set of data within data structure to include the second information associated with the first loader program that is associated with the first version of the application.

14. The computer program product of claim 8, further comprising:

program instruction to determine that a container is configured for multi-version support for an application:

wherein the multi-version support includes: an additional virtualization layer associated with the container, a runtime associated with the application, and a thread execution agent (TEA) related with the application; and wherein the TEA related to the application identifies information respectively associated with a version of the application.

15. A computer system for executing multiple versions of an application within a networked-computing environment, the computer system comprising:

one or more computer processors;
one or more computer readable storage media; and
program instructions stored on the computer readable storage media for execution by at least one of the one or more processors, the program instructions comprising:

program instructions to identify a request to execute an instance of a first version of an application within a networked-computing environment;

program instructions to determine that an instance of a second version of the application is active within the networked-computing environment;

program instructions to access a data structure including information associated with the application to obtain a first set of data corresponding to the first version of the application;

program instructions to determine whether the obtained first set of data indicates that the first version of the application is compiled;

program instruction to respond to determining that the first version of the application is compiled by copying, from a network accessible storage device, one or more executable objects associated with the first version of the application based, at least in part, on the first set of data, to the first container executing with the networked-computing environment;

program instructions identify the first set of data that corresponds to the first version of the application, wherein the first set of data includes a first information associated with a first program loader and one or more executable objects that correspond to first version of the application;

program instructions to respond to identifying that the first data does not include an indication related to one or more executable objects stored on the network accessible storage device that are associated with the first version of the application by identifying a third information within the data structure that is associated with the first version of the application;

program instruction to generate at least one executable object of the one or more executable objects associated with the first version of the application based on the first set of data, and a corresponding fourth information of the generated at least one executable object based, at least in part on the third information within the data structure that is associated with the first version of the application, wherein the at least one executable object is associated with compiled code of the first application;

program instructions to store the generated at least one executable object of the one or more executable objects associated with the first version of the application on the network accessible storage device;

program instructions to update the first set of data within data structure to include the fourth information corresponding to the generated at least one executable object that is associated with the first version of the application, wherein the fourth information includes an indication of a location within the network accessible storage device for the generated at least one executable object and an identifier of the generated at least on executable object; and program instructions to execute the copied one or more executable objects associated with the first version that comprise the requested instance of the first version of the application within the first container, executing within the computing environment, in addition to the active instance of the second version of the application while maintaining environmental variables utilized by the active instance of the second version of the application within the executing first container.

16. The computer system of claim 15:
wherein a request to execute an instance of the application is based, at least in part on a hypertext transfer protocol (HTTP) communication request; and
wherein the HTTP communication request includes information that dictates a version of the software to be executed.

17. The computer system of claim 15:
wherein the instance of the first version of the application is initiated to execute within the first container without restaging the active instance of the second version of the application within the executing first container.

18. The computer system of claim 15, further comprising:
program instruction to determine that a container is configured for multi-version support for an application:
wherein the multi-version support includes: an additional virtualization layer associated with the container, a runtime associated with the application, and a thread execution agent (TEA) related with the application; and
wherein the TEA related to the application identifies information respectively associated with a version of the application.

* * * * *